United States Patent [19]
Lowry et al.

[11] Patent Number: 5,564,163
[45] Date of Patent: Oct. 15, 1996

[54] LOCKABLE HINGE ASSEMBLY

[75] Inventors: David A. Lowry, Wayne; Yevgeny Novikov, Ambler, both of Pa.

[73] Assignee: Cema Technologies, Inc., Bridgeport, Pa.

[21] Appl. No.: 335,630

[22] Filed: Nov. 8, 1994

[51] Int. Cl.⁶ .................................................. E05D 11/08
[52] U.S. Cl. .................................................. 16/342
[58] Field of Search .......................... 16/342, 307, 308, 16/339, 337

[56] References Cited

U.S. PATENT DOCUMENTS

| | | | |
|---|---|---|---|
| 2,645,446 | 7/1953 | Ulrich | 248/291 |
| 5,010,983 | 4/1991 | Kitamura | 188/67 |
| 5,088,156 | 2/1992 | Hosoi | 16/342 |
| 5,173,837 | 12/1992 | Blackwell et al. | 361/380 |
| 5,197,704 | 3/1993 | Kitamura | 248/292.1 |
| 5,211,368 | 5/1993 | Kitamura | 248/292.1 |
| 5,231,734 | 8/1993 | Rude | 16/342 |

*Primary Examiner*—M. Rachuba
*Assistant Examiner*—Donald M. Gurley
*Attorney, Agent, or Firm*—Panitch, Schwarze, Jacobs & Nadel, P.C.

[57] ABSTRACT

A lockable hinge assembly for selectively rotatably locking a first hinge member to a second hinge member includes a first generally cylindrical member and a second member rotatably coupled to the first member. A wrap spring is interconnected between the first and second members. The wrap spring is movable with respect to the first member to control an amount of frictional torque applied between the wrap spring and the first member. An actuator member is in operative engagement with the wrap spring. The actuator is movable between first and second positions to move the wrap spring with respect to the first member to control the amount of frictional torque applied between the wrap spring and the first member such that when the actuator is in the first position a first amount of frictional torque is applied between the wrap spring and the first member to allow the first and second members to rotate with respect to each other, and when the actuator is in the second position a second amount of frictional torque is applied between the wrap spring and the first member to rotatably lock the first member to the second member.

15 Claims, 4 Drawing Sheets

LOCKABLE HINGE ASSEMBLY

FIELD OF THE INVENTION

The present invention relates to hinges and, more particularly, to a lockable hinge assembly for selectively rotatably locking a first hinge member to a second hinge member.

BACKGROUND OF THE INVENTION

It is known to provide hinge devices which rotatably couple a first member to a second member and to provide the hinge device with a degree of friction to provide positional, or angular control of a first member as it is rotated relative to the second member. Common applications for such friction hinges are in laptop and notebook-type computers to allow a user to position a liquid crystal display (LCD) screen at a selected location. While such frictional hinge devices have been acceptable for selectively positioning an LCD screen at a position where the display screen is merely used to read the matter displayed on the screen, such conventional frictional hinges are problematic when used in conjunction with touch-screen technology.

For portable, laptop or notebook computers which incorporate either pen-based functions or for point-of-sale terminals which include more basic touch-screen technology, the conventional friction hinges do not provide sufficient torque to hold the display screen in a selected location, considering the weight of the display as well as the torque generated from a user pressing a pen or finger on the display screen, given the allowable space for the hinge in the product. Even if a portable computer were designed to provide sufficient space to receive a conventional friction hinge which is large enough to provide torque capable of keeping the display screen in a selected location, such a device would exhibit the undesirable characteristic of producing a high level of torque at all times. That is, by producing a high level of torque at all times, the user must then exert a larger force on the display screen to rotate it from one position to another, making it difficult to position, and clumsy, from an ergonomic perspective.

Furthermore, if a user would attempt to close a display screen to the base of a portable computer which has a frictional hinge which produces high frictional torque at all times, the significant residual stress which remains in the casing or housing from the excessive torque would prevent the two halves of the housing from meeting uniformly together. As such, it would be necessary to greatly increase the wall thickness in the housing halves to account for the higher stresses encountered. Such a design variation is directly contrary to producing a portable computer which should be as lightweight as possible.

With respect to touch-screen technology, it has been known to (1) place a wedge-shaped block under the touch panel to keep it at a certain fixed angle; (2) firmly mount the touch panel at a fixed angle to a base; (3) include a ratchet-type mechanism; or (4) have some other complicated mechanism which requires the user to adjust a couple of elements simultaneously to achieve the proper height and angle of the touch panel. Concerning the wedge-shaped block and firmly mounting approaches, they do not permit positioning (rotation) of the touch panel. With respect to a ratchet mechanism, there is a risk for breakage of the ratchet teeth if the user applies a large external torque to the display screen.

Thus, a need has arisen for a lockable hinge assembly which will enable a user to selectively provide a high amount of frictional torque having a first state of operation wherein the frictional hinge assembly is unengaged and provides substantially zero frictional torque to allow the display screen to be freely movable with respect to the base of the portable computer, and a second position wherein a high amount of frictional torque is provided to lock the display screen with respect to the base of the portable computer to permit the use of touch-screen technology.

The present invention provides a lockable hinge assembly for selectively rotatably locking a first hinge member to a second hinge member which is relatively small, lightweight and simple to manufacture, so that it may easily be incorporated in a device whose main object is to be portable. The lockable hinge assembly of the present invention is lockable with only a relatively small actuation force in a relatively short actuation stroke. The lockable hinge assembly of the present invention achieves simultaneous application of torque-holding capability in two directions (i.e., clockwise and counterclockwise), while only requiring a single actuating stroke. Further, if a user exceeds the frictional torque capacity of the lockable hinge assembly of the present invention, the hinge assembly merely acts as an overrunning clutch.

SUMMARY OF THE INVENTION

Briefly stated, the present invention comprises a lockable hinge assembly for selectively rotatably locking a first hinge member to a second hinge member. The assembly comprises a first generally cylindrical member and a second member rotatably coupled to the first member. A wrap spring is interconnected between the first and second members. The wrap spring is movable with respect to the first member to control an amount of frictional torque applied between the wrap spring and the first member. An actuator member is in operative engagement with the wrap spring. The actuator is movable between first and second positions to move the wrap spring with respect to the first member to control the amount of frictional torque applied between the wrap spring and the first member such that, when the actuator is in the first position, a first amount of frictional torque is applied between the wrap spring and the first member to rotatably lock the first member to the second member, and when the actuator is in the second position, a second amount of frictional torque is applied between the wrap spring and the first member to allow the first and second members to rotate with respect to each other.

In another aspect of the present invention, the wrap spring is a double-acting coil wrap spring interconnected between the first and second members. The wrap spring includes a first coil positioned about the first member. The first coil includes an operating end extending therefrom. The operating end of the first coil is movable with respect to the first coil to control an amount of frictional torque applied between the first coil and the first member. A second coil is positioned about the first member. The second coil also includes an operating end extending therefrom. The operating end of the second coil is movable with respect to the second coil to control an amount of frictional torque applied between the second coil and the first member. A connecting member is interconnected between the first and second coils. The connecting member is affixed to the second member. The actuator member is in engagement with the operator ends of the first and second coils. The actuator is movable between first and second positions to move the operator ends with respect to the first and second coils to control the amount of frictional torque applied between the first and second coils and the first member, such that, when the actuator is in the first position, a first amount of frictional torque is applied between the first and second coils and the first member to rotatably lock the first member to the second member, and when the actuator is in the second position, a second amount of frictional torque is applied between the first and second coils and the first member to allow the first and second members to rotate with respect to each other.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there is shown in the drawings embodiments which are presently preferred. It should be understood, however, that the present invention is not limited to the precise arrangements and instrumentalities shown. In the drawings.

DETAILED DESCRIPTION OF PREFERRED EMBODIMENTS

Figure 1:
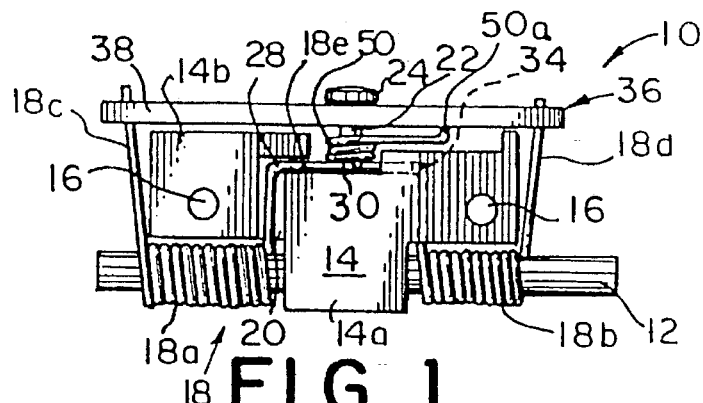
FIG. 1 is a front elevational view of a lockable hinge assembly in accordance with a first preferred embodiment of the invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the lockable hinge assembly and designated parts thereof. The terminology includes the words above specifically mentioned, derivatives thereof and words of similar import.

Referring to the drawings in detail, wherein like numerals are used to indicate like elements throughout, there is shown in FIGS. 1 through 9 a first preferred embodiment of a lockable hinge assembly, generally designated 10, for selectively rotatably locking a first hinge member (not shown) to a second hinge member (not shown). In the present embodiment, the first and second hinge members are not pertinent to the present invention and could be any number of items, such as a display screen and base unit for a portable or laptop computer (not shown) which are desired to be hingedly connected together. That is, it is understood by those of ordinary skill in the art that the lockable hinge assembly 10 is not limited to any particular use, and may be installed in many diverse products, including automobiles, medical devices and other consumer products.

Figure 2:
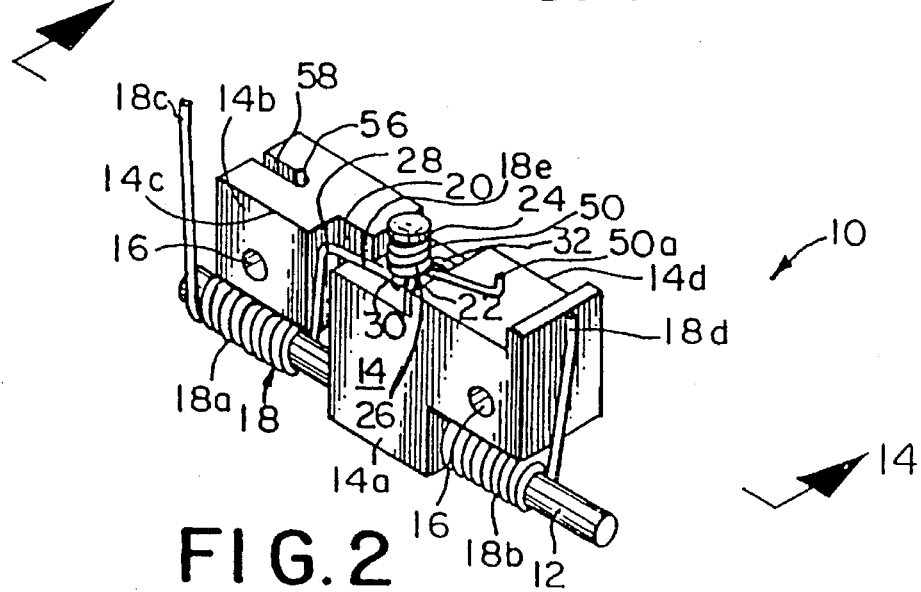
FIG. 2 is a top perspective view partially showing the hinge assembly shown in FIG. 1.

Referring now to FIGS. 1 and 2, the lockable hinge assembly 10 includes a first generally cylindrical member 12. The first member 12 is preferably constructed of a lightweight, high strength material, such as a steel alloy. However, it is understood by those skilled in the art that the first member 12 could be constructed of other materials, such as zinc or a polymeric material, without departing from the spirit and scope of the invention. It is preferred that the first member 12 be fixedly secured to the first hinge member (not shown) to couple the first hinge member to the lockable hinge assembly 10. The manner in which the first member 12 is fixedly secured to the first hinge member is not pertinent to the present invention, and could be accomplished by securing the first hinge member to either end of the first member 12. For instance, a cantilevered leaf (not shown) could extend from one end of the first member 12 and include apertures therein for receiving fasteners to secure the first member 12 to the first hinge member.

As shown in FIGS. 1 and 2, the lockable hinge assembly 10 also includes a second member 14 rotatably coupled to the first member 12. The second member 14 is generally T-shaped in elevational view and includes a vertical portion 14a having an aperture (not shown) extending therethrough, which is suitably sized for rotatably receiving the first member 12. The second member 14 includes a horizontal portion 14b which includes a pair of mounting holes 16 at its ends for receiving suitably sized fasteners, such as screws or rivets, to mount the second member 14 to the second hinge member to thereby permit the second hinge member to rotate with respect to the first hinge member. The second member 14 is preferably constructed of zinc, although different materials, such as aluminum or plastic, could be used without departing from the spirit and scope of the invention.

Referring now to FIG. 1, there is shown a wrap spring 18 which is interconnected between thee first and second members 12, 14. The wrap spring 18 is movable with respect to the first member 12 to control an amount of frictional torque applied between the wrap spring 18 and the first member 12. More particularly, it is preferred that the wrap spring 18 be formed from a single length of wire and be a double-acting coil wrap spring having a first coil 18a and a second coil 18b. The first coil 18a is positioned about the first member 12 and includes an operating end 18c extending therefrom. The operating end 18c of the first coil 18a is movable with respect to the first coil 18a to control an amount of frictional torque applied between the first coil 18a and the first member 12. Similarly, the second coil 18b is positioned about the first member 12 and includes an operating end 18d extending therefrom. It is preferred that the first and second coils 18a, 18b be positioned on the first member 12 on opposite sides of the vertical portion 14a of the second member 14. The operating end 18d of the second coil 18b is movable with respect to the second coil 18b to control an amount of frictional torque applied between the second coil 18b and the first member 12. That is, the amount of frictional torque applied between the first and second coils 18a, 18b and the first member 12 is controlled by movement of the operating ends 18c, 18d which cause the first and second coils 18a, 18b to wrap down on the first member 12 or unwrap from the first member 12 in a manner well understood by those of ordinary skill in the art. Accordingly, further description of the operating characteristics of the first and second coils 18a, 18b is omitted for purposes of convenience and brevity only, and is not limiting.

Figure 14:
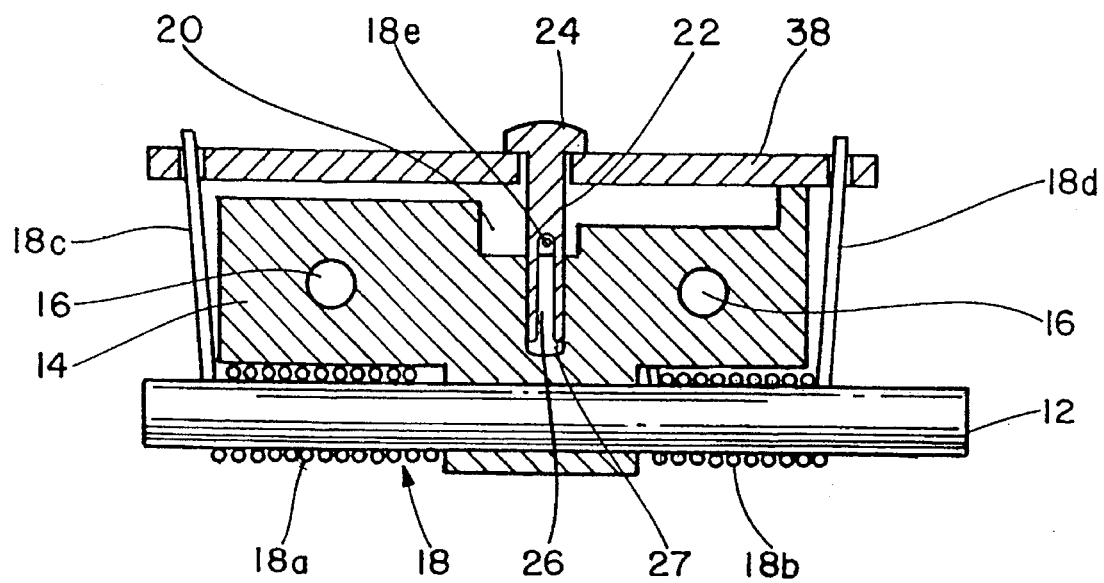
FIG. 14 is a cross-sectional view of the lockable hinge assembly in accordance with the first prepared embodiment taken along line 14—14 of FIG. 2.

As best shown in FIG. 2, a connecting member 18e is interconnected between the first and second coils 18a, 18b and is fixed to the second member 14. In the present embodiment, it is preferred that the connecting member 18c be positioned within a cutout or groove 20 in the horizontal portion 14b of the second member 14, as described in more detail hereinafter. Generally centrally disposed in the groove 20 on the upper surface of the second member 14 is a pintle 22 extending generally upwardly and including an enlarged head 24, for reasons which are also described hereinafter. The end of the pintle 22 opposite from the head 24 includes a slot 26 for receiving the connecting member 18e therein to fix the connecting member 18e to the second member 14, as shown in FIG. 14. The pintle 22 is preferably mounted within a generally centrally disposed, vertically extending bore 27 in the upper surface of the groove 20 in the second member 14 with a friction fit, so that the pintle 22 is securely mounted to the second member 14.

The connecting member 18e extends between the first and second coils 18a, 18b of the wrap spring 18 and is preferably generally in engagement with the second member 14 along the entire length of the connecting member 18 between the first and second coils 18a, 18b. That is, the connecting member 18e is positioned within the groove 20 such that it is in engagement with the second member 14 or groove 20 along its entire length. The connecting member 18e includes at least two ninety-degree bends therein for evenly dissipating forces within the connecting member 18e. More particularly, it is preferred that the connecting member 18e include four ninety-degree bends therein for evenly dissipating forces within the connecting member. The first ninety-degree bend 28 is located proximate the first coil 18a and is best shown in FIGS. 1 and 2. The second ninety-degree bend 30 is located in front of the slot 26 in the pintle 22 and permits the connecting member 18e to extend through the slot 26 in the pintle 22. The third ninety-degree bend. 32 is located on the side of the pintle 22 opposite from the second ninety-degree bend 30. The fourth ninety-degree bend 34 is located generally in the same position as the first ninety-degree bend 28 with respect to the second coil 18b on the opposite side of the second member 14. By incorporating the first, second, third and fourth ninety-degree bends 28, 30, 32 and 34 in the connecting member 18e, the connecting member 18e extends from the first coil 18a on a first or front side 14c of the second member 14 to the second coil 18b on a second or rear side 14d of the second member 14.

It is important to dissipate the forces within the connecting member 18e because whenever either of the first or second coils 18a, 18b is in a wrapped, down position, that is, such that the inner diameter of the coil would have a smaller diameter than the outside diameter of the first member 12 if the first member 12 were removed from the coil, there exist forces which tend to pull the portion of the connecting member 18e proximate the first and second coils 18a, 18b along a direction which is perpendicular to the longitudinal axis of the first member 12. Since, by the nature of the lockable hinge assembly 10 it must be configured into a small package or area, it is important that the forces within the connecting member 18e proximate the first and second coils 18a, 18b be dissipated without significantly increasing the overall size of the lockable hinge assembly 10. It is recognized by those skilled in the art that by incorporating the first, second, third and fourth ninety-degree bends 28, 30, 32, 34 in the connecting member 18e, the forces within the connecting member 18e proximate the first and second coils 18a, 18b are dissipated, without having to unduly increase the overall size of the lockable hinge assembly 10.

In the first preferred embodiment, the wrap spring 18 is preferably constructed of a high-strength, lightweight, flexible material which has sufficient memory to return to an original configuration after being flexed, such as music wire having a diameter of about 0.050 inches. Although in the first preferred embodiment it is preferred that the wrap spring 18 be comprised of music wire, it is understood by those skilled in the art that other materials could be used to construct the wrap spring 18, such as stainless steel and polymeric composites. In the first preferred embodiment, the wrap spring 18 is preferably generally circular in cross section. However, it is understood by those skilled in the art that the wrap spring 18 can be configured to have a different cross-sectional configuration, including a parallelogram, oval, square or triangular, without departing from the spirit and scope of the invention. Further, the pintle 22 is preferably constructed of the same material as the second member 14, although other materials, such as an aluminum alloy or plastic, could be used, so long as the material has sufficient strength to secure the connecting member 18e to the second member 14.

As mentioned above, in the first preferred embodiment, it is preferred that the wrap spring 18 be a double-acting coil wrap spring having first and second coils 18a, 18b. However, it is understood by those skilled in the art that the present invention is not limited to the use of a double-acting coil wrap spring, and that a single coil-wrap spring (not shown) could be used without departing from the spirit and scope of the invention.

Referring now to FIGS. 5 through 9, there is shown an actuator member 36 in operative engagement with the wrap spring 18. The actuator 36 is movable between first (shown in FIGS. 5 and 9) and second (shown in FIG. 7) positions to move the wrap spring 18 with respect to the first member 12 to control the amount of frictional torque applied between the wrap spring 18 and the first member 12 such that when the actuator 36 is in the first position, a first amount of frictional torque is applied between the wrap spring 18 and the first member 12 to allow the first and second members 12, 14 to rotate with respect to each other and, when the actuator 36 is in the second position, a second amount of frictional torque is applied between the wrap spring 18 and the first member 12 to rotatably lock the first member 12 to the second member 14o More particularly, it is preferred that the actuator member 36 be in operative engagement with the operator ends 18c, 18d of the first and second coils 18a, 18b. When the actuator 36 is moved between the first and second positions, it moves the operator ends 18c, 18d with respect to the first and second coils 18a, 18b to control the amount of frictional torque applied between the first and second coils 18a, 18b and the first member 12. Thus, when the actuator 36 is in the first position, the first amount of frictional torque is applied between the first and second coils 18a, 18b and the first member 12 to allow the first and second members 12, 14 to rotate with respect to each other, and when the actuator 36 is in the second position, the second amount of frictional torque is applied between the first and second coils 18a, 18b and the first member 12 to rotatably lock the first member 12 to the second member 14.

Figure 3:
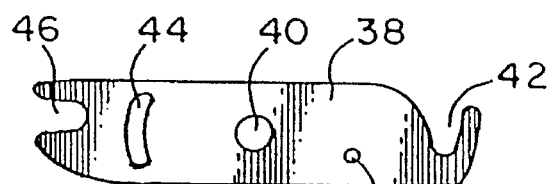
FIG. 3 is a top plan view of an actuator member of the hinge assembly shown in FIG. 1.
Figure 4:
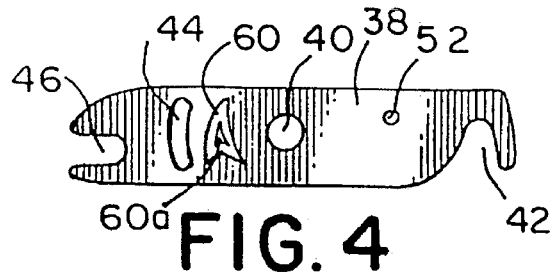
FIG. 4 is a bottom plan view of the actuator member shown in FIG. 3.

Referring now to FIGS. 3 and 4, the actuator 36 includes a plate 38 which is positioned over the second member 14. More particularly, the plate 38 includes an aperture 40 extending generally centrally therethrough for rotatably receiving the pintle 22. It is preferred the head 24 of the pintle 22 be located above the plate 38 to securely retain the plate 38 between the head 24 and second member 14. One end of the plate 38 includes a first slot 42 which is open ended and extends generally transversely with respect to the longitudinal axis of the first member 12 for receiving the operating end 18d of the second coil 18b. The other end of the plate 38 includes a second, slightly arcuate, slot 44 which is generally closed and extends generally transverse to the longitudinal axis of the first member 12 for receiving the operating end 18c of the first coil 18a. At the same end of the actuator 36 as the second slot 44, there is a third slot 46, which is generally open and extends generally parallel to the longitudinal axis of the first member 12 for receiving a drive member 48.

In the present embodiment, it is preferred that the drive member 48 be in the form of a button, which is finger-actuable by a user, to move the actuator 36 between the first and second positions. While in the first preferred embodiment, it is preferred that the drive member 48 be a manually actuated finger button, it is understood by those skilled in the art, that the actuator 36 could be moved between the first and second positions in any manner, including either manually or automatically, such as by a slide, rotating thumb wheel or a servo motor.

Referring now to FIGS. 1 and 2, the lockable hinge assembly 10 further includes a biasing member 50 positioned between the second member 14 and the actuator 36 which biases the actuator 36 to one of the first and second positions. In the present embodiment, it is preferred that the biasing member be a torsion spring which is wrapped about the pintle 22 and includes a distal end 50a fixedly secured within an aperture 52 on the underside of the plate 38 of the actuator 36 and a proximal end (not shown) positioned within the slot 26 of the pintle 22 to prevent the proximal end of the spring from moving with respect to the pintle 22. In the first preferred embodiment, the torsion spring preferably biases the actuator 36 generally clockwise, as viewed in FIGS. 5 to 9, to the second position in which the first and second members 12, 14 are locked with respect to each other, as described in more detail hereinafter.

In the first preferred embodiment, the biasing member 50 is preferably constructed of the same material as the wrap spring 18. Moreover, in the first preferred embodiment, the plate 38 is preferably constructed of a lightweight, high-strength material, such as a cast metal. However, it is understood by those skilled in the art that the plate 38 could be constructed of other materials, such as a machined metal or from a molded polymeric material.

While in the first preferred embodiment it is preferred that the biasing member 50 be a torsion spring, it is understood by those skilled in the art that any type of spring could be used to bias the actuator 36 to either the first or second positions, including a coil or leaf spring.

Referring now to FIGS. 2 through 9, the lockable hinge assembly 10 further includes a toggle mechanism, generally designated 54, interconnected between the actuator 36 and the second member 14 for selectively maintaining the actuator 36 in either of the first and second positions. In the first preferred embodiment, the toggle mechanism is used to toggle the actuator 36 between the first and second positions. The toggle mechanism 54 comprises a cam follower in the form of a pin 56 slidably disposed within a slot 58 in the horizontal portion 14b of the second member 14 above the first coil 18a. A cam groove 60, which is generally V-shaped, is formed in the underside of the plate 38 above the pin 56 for receiving the pin 56 therein. The cam groove 60 includes a raised center portion or cam island 60a for assisting in defining the cam groove 60. The cam groove 60 in the plate 38 maintains the pin 56 in the slot 58 such that the pin 56 floats within the slot 58 when the actuator 36 is moved between the first and second positions, as described in more detail hereinafter.

While in the first preferred embodiment it is preferred that the actuator 36 be selectively maintained in either of the first and second positions by the combination of the toggle mechanism 54 and biasing member 50, it is understood by those skilled in the art that other devices, such as an electromagnet and air cylinder, may be used to maintain the actuator member 36 in either of the first and second positions, without departing from the spirit and scope of the invention.

When the wrap spring 18 is formed, the first and second coils 18a, 18b are wrapped in the same direction. As a result, when the actuator 36 is in the first position (FIGS. 5 and 9) the first coil 18a prevents the first member 12 from rotating in a first direction with respect to the second member 14, and the second coil 18b prevents the first member 12 from rotating in a second, but opposite, direction with respect to the second member 14. This is a significant advantage, because the lockable hinge assembly 10 locks the first member 12 with respect to the second member 14 in both the clockwise and counterclockwise directions. Furthermore, even when the actuator 36 is in the second or locked position, the first member 12 can be moved with respect to the second member 14 if the forces applied between the first and second members 12, 14 exceed the amount of frictional torque applied between the first and second coils 18a, 18b and the first member 12, since, due to the nature of a wrap spring, the first member 12 will overrun force applied in either of the holding directions of the first or second coils 18a, 18b in a manner well understood by those skilled in the art, thereby avoiding any potential damage to the lockable hinge assembly 10.

To assemble the lockable hinge assembly 10, the second hinge member 14 is positioned as shown in FIG. 2 with the horizontal portion 14b positioned above the vertical portion 14a. The pintle 22 is then positioned through the aperture 40 in the plate 38 such that the head 24 of the pintle 22 is in engagement with the plate 38. The biasing member 50 is then positioned over the pintle 22 such that the proximal end of the biasing member 50 is disposed within the slot 26 to rotatably fix the biasing member 50 to the pintle 22 with the distal end 50a extending towards the first slot 42 such that the distal end 50a is positioned within the aperture 52. The wrap spring 18, having been previously bent to the configuration shown in FIGS. 1 and 2, is then positioned with the connecting member 18e within the groove 20 such that a portion of the connecting member 18e overlies the generally centrally disposed, vertically extending bore in the second member 14 for receiving the pintle 22. The pintle 22, biasing member 50 and plate 38 are then positioned over the second member 14 until the slot 26 in the pintle 22 receives the connecting member 18e therein, and allows the pintle 22 to extend downwardly into the vertically extending, centrally disposed bore in the second member 14. The pintle 22 is preferably received within the vertically extending bore with a friction fit to firmly secure the actuator member 38, biasing member 50, wrap spring 18 and plate 38 to the second member 14. When the pintle 22 is firmly secured within the vertically extending, centrally disposed bore, the operating ends 18c, 18d are located within the second slot 44 and first slot 42, respectively. Similarly, the pin 56 is located within the cam groove 60 in the position C shown in FIG. 7.

When the wrap spring 18 is in its relaxed position, the inner diameter of the first and second coils 18a, 18b is less than the outer diameter of the first member 12. Hence, in order to permit the first member 12 to be disposed through the first and second coils 18a, 18b and the aperture in the vertical portion 14a of the second member 14, it is necessary to move the operating ends 18c, 18d of the first and second coils 18a, 18b to increase the internal diameter of the first and second coils 18a, 18b and permit the first member 12 to be passed therethrough and the aperture in the vertical portion 14a of the second member 14 to thereby assemble the lockable hinge assembly 10. The operating ends 18c, 18d of the first and second coils 18a, 18b can be moved to increase the internal diameter of the first and second coils 18a, 18b either manually, by hand, automatically or by use of the actuator 36, as described below.

There is shown in FIGS. 5 through 9 the sequence of operation of the lockable hinge assembly 10.

Figure 5:
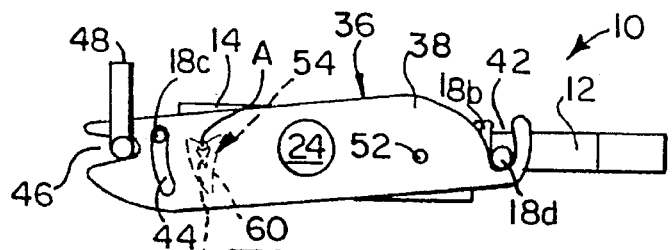
FIG. 5 is a top plan view of the hinge assembly shown in FIG. 1 in a first or unlocked position.

Referring now to FIG. 5, the actuator 36 is shown in the first, or unlocked, position in which the first member 12 is free to rotate with respect to the second member 14. In this position, the pin 56 is located within the cam groove 60 at the position A. The operating end 18d of the second coil 18b is in engagement with the base of the first slot 42 and the operating end 18c of the first coil 18a is in engagement with the top of the second slot 44 such that the operating ends 18c, 18d are under tension and have caused the first and second coils 18a, 18b to slightly unwrap a sufficient degree such that a minimal amount of frictional torquer approaching zero, exists between the first member 12 and the second member 14 such that the first member 12 can freely rotate with respect to the second member 14. Thus, the actuator 36 is in the second position and is maintained in the second position by the combination of the biasing member 50 and the pin 56 being positioned within the cam groove 60 at the position A. That is, the biasing member 50 applies a clockwise tension to the plate 38 as viewed in FIG. 5. The pin 56 is forced against the notched portion of the cam island 60a to maintain the actuator in the position shown in FIG. 5. In this position, the operating ends 18c, 18d of the first and second coils 18a, 18b are in engagement with the first and second slots 42, 44 such that the operating ends 18c, 18d are moved with respect to the first and second coils 18a, 18b to expand the inner diameter of the first and second coils 18a, 18b and control the amount of frictional torque applied between the first and second coils 18a, 18b and the first member 12 to allow the first and second members 12, 14 to rotate with respect to each other. The amount of frictional torque applied between the first and second coils 18a, 18b and the first member 12 is controlled by the relative positions of the operating ends 18c, 18d with respect to the first and second coils 18a, 18b, respectively, the number of coils in the first and second coils 18a, 18b, the relative sizes of the first member 12 and the first and second coils 18a, 18b and other factors understood by those of ordinary skill in the art.

While it is preferred that the amount of frictional torque applied between the first and second coils 18a, 18b and the first member 12 when the actuator 36 is in the first, or unlocked, position be minimal, i.e., approaching zero, to permit the first and second members 12, 14 to further rotate with respect to each other, it is understood by those skilled in the art that a greater amount of frictional torque could be applied between the first and second coils 18a, 18b on the first member 12 to permit a degree of angular control between the first member 12 and the second member 14. Such a degree of angular control could be used, for example, in a laptop computer to prevent the display screen from falling to the base of the computer when the actuator 36 is in the first position.

Figure 6:
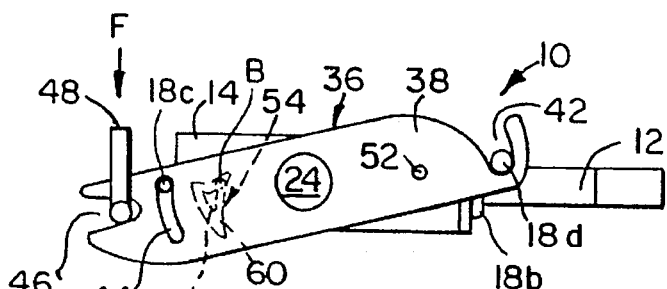
FIG. 6 is a top plan view of the hinge assembly shown in FIG. 1 in a position intermediate the unlocked and locked positions.
Figure 7:
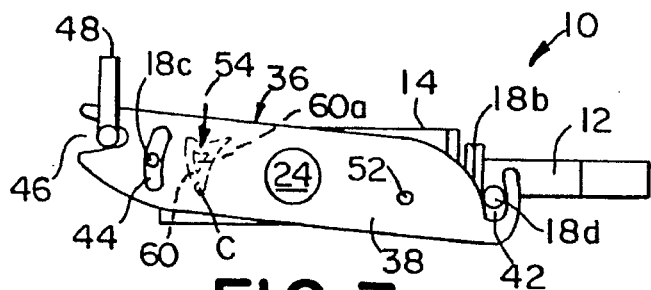
FIG. 7 is a top plan view of the hinge assembly shown in FIG. 1 in the locked position.

To lock the first and second members 12, 14 with respect to each other, the user applies force to the drive member 48 in the direction of the arrow F, shown in FIG. 6, against the biasing force of the biasing member 50. The user applies force to the drive member 48 until the pin 56 moves from the notch in the cam island 60a to the upper right-hand corners identified as position B, in the cam groove 60, at which point the plate 38 is prevented from rotating any further in the counterclockwise direction. At this point, the user releases the force against the drive member 48, and the biasing member 50 causes the plate 38 to rotate clockwise, whereupon the pin 56 moves along the right-hand wall, as viewed in FIG. 6, of the cam groove 60 until it rests in the bottom of the cam groove 60, identified as position C, whereupon the biasing force of the biasing member 50 and the position of the pin 56 in the cam groove 60 maintain the plate 38 in the position shown in FIG. 7. As shown in FIG. 7, when the plate 38 is in the second position, the operating ends 18c, 18d are loosely positioned within the first and second slots 42, 44 such that no force is applied to the operating ends 18c, 18d. Therefore, the first and second coils, 18a, 18b are tightly wrapped around the first member 12 to prevent the first member 12 from rotating with respect to the second member 14, as described in more detail hereinafter.

Figure 8:
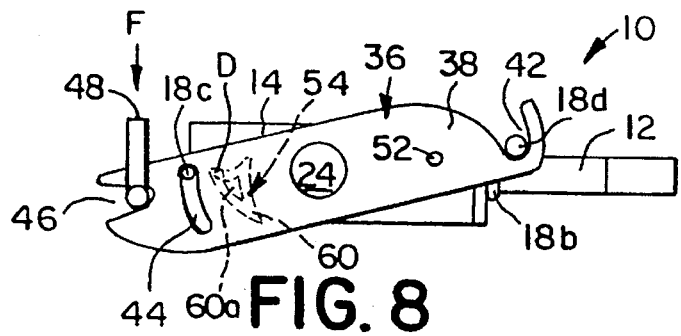
FIG. 8 is a top plan view of the hinge assembly shown in FIG. 1 in a position intermediate the locked and unlocked positions.
Figure 9:
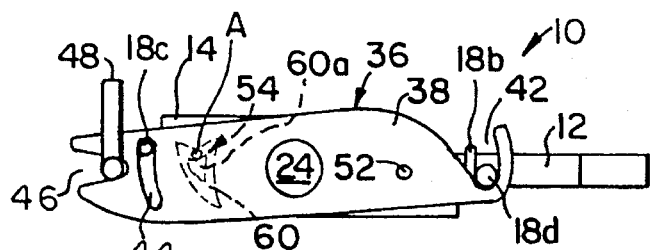
FIG. 9 is a top plan view of the hinge assembly shown in FIG. 1 in the unlocked position and is identical to FIG. 5.

To move the actuator 36 from the second position to the first position, the user again applies a force to the drive member 48 in the direction of the arrow F, as shown in FIG. 8, to move the plate 38 in the counterclockwise direction against the biasing force of the biasing member 50. As the plate 38 begins to rotate counterclockwise, the pin 56 moves from the position C along the left wall of the cam groove 60, as viewed in FIG. 8, to the upper left-hand corner of the cam groove 60, marked as position D. Once the pin 56 has reached the position D, the plate 38 cannot be rotated any further. The user then releases the force applied to the driving member 48. The biasing member 50 then rotates the plate 38 clockwise to move the pin 56 into the position A, as shown in FIGS. 5 and 9. When the actuator 36 is in the first position shown in FIGS. 5 and 9, the first and second members 12, 14 are free to rotate with respect to each other, as discussed above.

When the actuator 36 is in the second position, as shown in FIG. 7, the amount of frictional torque applied between the wrap spring 18 and the first member 12 is at least ten times greater than the first amount of frictional torque applied between the wrap spring 18 and first member 12 when the actuator 36 is in the first position. More particularly, it is preferred that the second amount of frictional torque be in the range of about two to twenty times greater than the first amount of frictional torque, in order to securely lock the first and second members 12, 14 together when the actuator 36 is in the second position. Of course, it is understood by those skilled in the art that the particular amount of frictional torque applied between the first and second members 12, 14 is dictated by the number of coils in the first and second coils 18a, 18b, the size of the lockable hinge assembly 10, and the length of the actuating stroke, all of which can be selected in accordance with the desired amount of frictional torque to be applied, as is well understood by those of ordinary skill in the art.

With the foregoing description and explanation of the lockable hinge assembly 10 shown in FIGS. 1 through 9, the description of the second and third preferred embodiments of the invention will be described with respect to FIGS. 10 to 12 and 13, respectively. In essence, each lockable hinge assembly illustrated in FIGS. 10 through 13 is similar to the lockable hinge assembly 10 illustrated in FIGS. 1 through 9. For this reason, the last two digits of the identifying numbers of FIGS. 10 through 13 correspond generally to the two digits of the identifying numerals in FIGS. 1 through 9. The entire description of identical components therefore will not be repeated with respect to the embodiments of FIGS. 10 through 13. Identifying numerals are included in the embodiments of FIGS. 10 through 13 for ease of reference during examination, though all elements identified are not described in detail.

Figure 12:
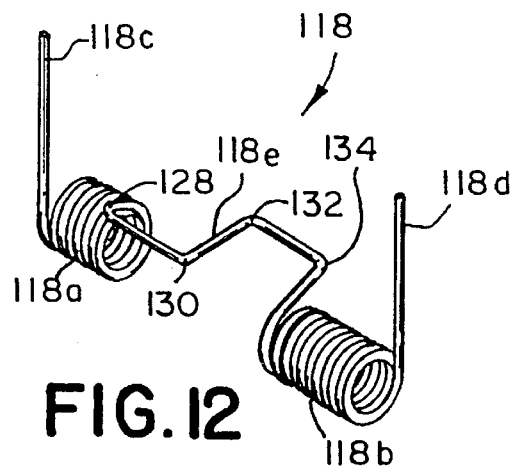
FIG. 12 is a perspective view of a wrap spring used in the lockable hinge assembly shown in FIGS. 10 and 11.
Figure 10:
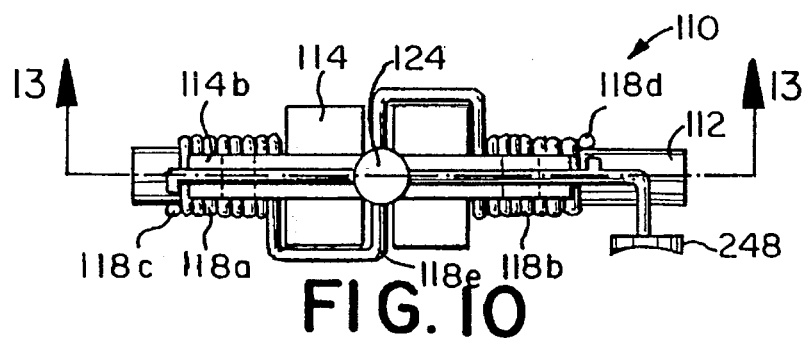
FIG. 10 is a top plan view of a lockable hinge assembly in accordance with a second preferred embodiment of the invention.
Figure 11:
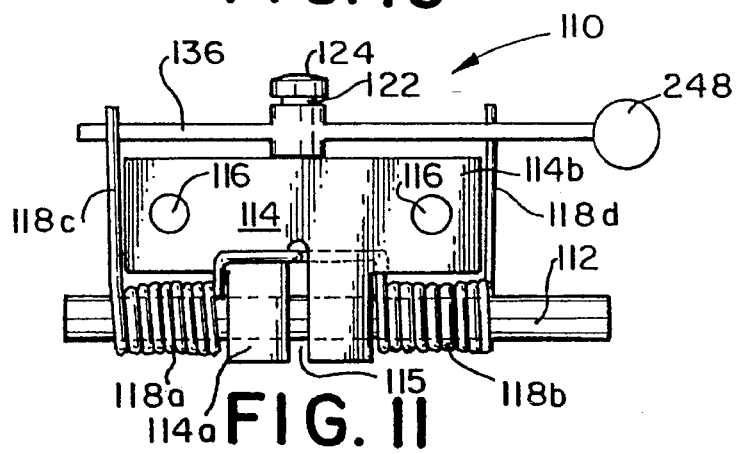
FIG. 11 is a front elevational view of the lockable hinge assembly shown in FIG. 10.

Referring now to FIGS. 10 through 12, there is shown a second preferred embodiment of a lockable hinge assembly 110, in accordance with the present invention. There are two main differences between the lockable hinge assembly 110 shown in FIGS. 10 through 12 and the lockable hinge assembly 10 shown in FIGS. 1 through 9. First, instead of the connecting member 118e of the wrap spring 118 extending over the top of the second member 114, the vertical portion 114a of the second member 114 includes a slot 115 for allowing the connecting member 118e to extend therethrough. Second, the lockable hinge assembly 110, in accordance with the second preferred embodiment, does not include any means for maintaining the actuator 136 in either of the first or second positions. Thus, if the user is willing to press in and hold the drive member 148 every time it is desired to allow the first member 112 to move with respect to the second member 114, the lockable hinge assembly 110 in accordance with the second preferred embodiment will operate identically to that described above in connection with the first preferred embodiment. Thus, when the actuator 136 is in the position shown in FIG. 10, the first member 112 is securely locked to the second member 114.

Figure 13:
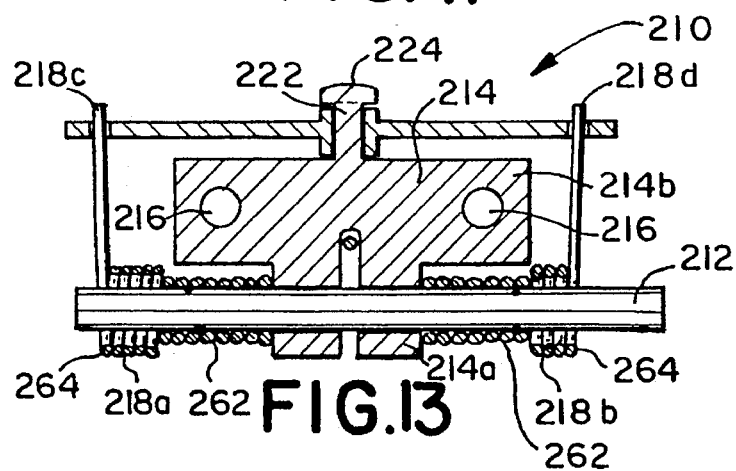
FIG. 13 is a cross-sectional view of the lockable hinge assembly shown in FIG. 10 taken along lines 13—13 of FIG. 10 except that a wrap spring in accordance with a third preferred embodiment is used.

Referring now to FIG. 13, there is shown a third preferred embodiment of a lockable hinge assembly 210. The third preferred embodiment of the lockable hinge assembly 210 is generally identical to the second preferred embodiment of the lockable hinge assembly 110. In the lockable hinge assembly 210, the first and second coils 218a, 218b each include a first number of coils 262 having a first diameter, and a second number of coils 264 having a second diameter. The first diameter of the first number of coils 262 is less than the second diameter of the second number of coils 264. In the third preferred embodiment, the user is able to specify an amount of frictional torque which is applied to the first member 212 when the lockable hinge assembly 210 is in the first or unlocked position. In the first position, the first number of coils 262 will always be in contact with the first member 212 such that the inner diameters of the first number of coils 262 of both the first and second coils 218a, 218b, respectively, are smaller than the outside diameter of the first member 212 to create an interference fit. Thus, frictional torque will be imparted to the first member 212 from the first and second coils 218a, 218b whenever the first member 212 is rotated.

The second number of coils 264 are designed to act as torsion springs which partially relieve the amount of interference between the first number of coils 262 and the first member 212 whenever a user presses against the actuator 236 to place the lockable hinge assembly 210 in the first or unlocked position. When the actuator 36 is moved to the first or unlocked position the first number of coils 262 impart controlled frictional torque to the first member 212. Another way to accomplish the same function of the third embodiment is to create constant friction between the first member 212 and the second member 214. For instance, the first number of coils 262 could be replaced with friction elements positioned between the first member 212 and the vertical portion 214a of the second member 214 or the first member 212 could be positioned within the second member 214 with all interference fit to create the constant friction. Such friction elements would impart controlled frictional torque to the first member 212.

From the foregoing description it can be seen that the present invention is directed to a lockable hinge assembly for selectively rotatably locking a first hinge member to a second hinge member. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A lockable hinge assembly for selectively rotatably locking a first hinge member to a second hinge member, said assembly comprising:

(a) a first generally cylindrical member;

(b) a second member directly rotatably disposed on said first member;

(c) a wrap spring interconnected between said first and second members, said wrap spring being movable with respect to said first member to control an amount of frictional torque applied between said wrap spring and said first member;

(d) an actuator member in operative engagement with the wrap spring, said actuator being movable between first and second positions to move said wrap spring with respect to said first member to control the amount of frictional torque applied between said wrap spring and said first member such that when said actuator is in said first position a first amount of frictional torque is applied between said wrap spring and said first member to allow said first and second members to rotate with respect to each other and when said actuator is in said second position a second amount of frictional torque is applied between said wrap spring and said first member to rotatably lock said first member to said second member.

2. The lockable hinge assembly as recited in claim 1 wherein said wrap spring is formed from a single length of wire.

3. The lockable hinge assembly as recited in claim 2 wherein said wrap spring includes a first number of coils having a first diameter and a second number of coils having a second diameter, said first diameter being greater than said second diameter.

4. The lockable hinge assembly as recited in claim 1 further including a biasing member positioned between said second member and said actuator member biasing said actuator member to one of said first and second positions.

5. The lockable hinge assembly as recited in claim 1 wherein the second amount frictional torque is at least ten times greater than the first amount of frictional torque.

6. The lockable hinge assembly as recited in claim 1 further including a toggle mechanism interconnected between said actuator and said second member for selectively maintaining said actuator in either of said first and second positions.

7. A lockable hinge assembly for selectively rotatably locking a first hinge member to a second hinge member, said assembly comprising:

(a) a first generally cylindrical member;

(b) a second member rotatably coupled to said first member;

(c) a double acting coil wrap spring interconnected between said first and second members, said wrap spring comprising:

(i) a first coil positioned about said first member and including an operating end extending therefrom, said operating end of said first coil being movable with respect to said first coil to control an amount of frictional torque applied between said first coil and said first member;

(ii) a second coil positioned about said first member and including an operating end extending therefrom, said operating end of said second coil being movable with respect to said second coil to control an amount of frictional torque applied between said second coil and said first member;

(iii) a connecting member interconnected between said first and second coils, said connecting member being fixed to said second member;

(d) an actuator member in aperture engagement with tile operating ends of said first and second coils, said actuator being movable between first and second positions to move said operating ends with respect to said first and second coils to control the amount of frictional torque applied between said first and second coils and said first member such that when said actuator is in said first position a first amount of frictional torque is applied between said first and second coils and said first member to allow said first and second members to rotate with respect to each other and when said actuator is in said second position a second amount of frictional torque is applied between said first and second coils and said first member to rotatably lock said first member to said second member.

8. The lockable hinge assembly as recited in claim 7 wherein said first and second coils are wrapped in the same direction such that when the actuator is in the first position said first coil prevents the first member from rotating in a first direction with respect to said second member and said second coil prevents the first member from rotating in a second opposite direction with respect to said second member.

9. The lockable hinge assembly as recited in claim 7 wherein said coil wrap spring is formed from a single length of wire.

10. The lockable hinge assembly as recited in claim 7 further including a biasing member positioned between said second member and said actuator member biasing said actuator member to one of said first and second positions.

11. The lockable hinge assembly as recited in claim 7 wherein said connecting member of said wrap spring has a length and is generally in engagement with said second member along said length, said connecting member including at least two ninety degree bends therein for evenly dissipating forces within said connecting member.

12. The lockable hinge assembly as recited in claim 7 wherein the second amount frictional torque is at least ten times greater than the first amount of frictional torque.

13. The lockable hinge assembly as recited in claim 7 further including a toggle mechanism interconnected between said actuator and said second member for selectively maintaining said actuator in either of said first and second positions.

14. The lockable hinge assembly as recited in claim 7 wherein said second member includes first and second sides and said connecting member extends from said first coil on said first side of said second member and to said second coil on said second side of said second member.

15. The lockable hinge assembly as recited in claim 7 wherein said first and second coils each include a first number of coils having a first diameter and a second number of coils having a second diameter, said first diameter being greater than said second diameter.

* * * * *